United States Patent
Drewitz et al.

(10) Patent No.: US 6,168,004 B1
(45) Date of Patent: Jan. 2, 2001

(54) CONTAINER DISTRIBUTION APPARATUS

(75) Inventors: Hugues Drewitz, St-Eustache; Graham Lewis, Montreal; Louis Pallay, Beaconsfield; Max Yablonovitch, Dollard-des-Ormeaux, all of (CA)

(73) Assignee: Kalish Canada, Inc., Kirkland (CA)

( * ) Notice: Under 35 U.S.C. 154(b), the term of this patent shall be extended for 0 days.

(21) Appl. No.: 09/186,707

(22) Filed: Nov. 5, 1998

(51) Int. Cl.$^7$ .................................................. B65G 37/00
(52) U.S. Cl. ...................... 198/346.2; 198/358; 198/368; 198/370.1
(58) Field of Search ..................... 198/357, 358, 198/368, 370.01, 370.03, 370.06, 370.1, 346.2

(56) References Cited

U.S. PATENT DOCUMENTS

| | | |
|---|---|---|
| 2,510,568 | 6/1950 | Fouse . |
| 2,583,313 * | 1/1952 | Albertoli ............................. 198/368 |
| 3,994,117 | 11/1976 | Kinney . |
| 4,291,797 * | 9/1981 | Ewertowski ..................... 198/320.06 |
| 4,378,665 | 4/1983 | Crankshaw et al. . |
| 5,713,180 | 2/1998 | Lewiz . |

\* cited by examiner

*Primary Examiner*—Joseph E. Valenza
(74) *Attorney, Agent, or Firm*—Ratner & Prestia

(57) ABSTRACT

A container distribution apparatus having a frame surrounding a revolvable turret, the revolvable turret comprises intermediate transport members in the shape of slots adapted to receive containers from a feeding member such as a conveyor belt, to transport and to deliver containers to accumulator members located between the revolvable turret and the processing machines, to retrieve containers from accumulator members, and to transport containers to a exiting member such as a conveyor belt, each accumulator member is capable of carrying containers to and from a processing machine. A synchronization unit coordinates the transfer of containers to and from the accumulator members by activating a drive mechanism in a step-like manner to rotate the revolvable turret and by activating the opening and closing of gates located at the junction of the intermediate transport members and the accumulator members. Processing machines are positioned around the container distribution apparatus and are supplied with unprocessed containers and relieved of processed container. All Processing machines around the container distribution apparatus perform the same task. This arrangement creates a processing system that is faster then previously known processing systems.

23 Claims, 6 Drawing Sheets

CONTAINER DISTRIBUTION APPARATUS

FIELD OF THE INVENTION

The present invention relates to a novel container processing station suitable for the packaging industry and in particular the pharmaceutical industry where products are packaged in small containers format to be purchased by the customer. The apparatus is designed to accelerate and optimize the different steps involved in processing containers.

BACKGROUND OF THE INVENTION

Revolvable turrets or so-called "star-wheel[[P]' have been used extensively to supply containers to various processing machines positioned along an arcuate path, each processing machine performing a specific operation and each operation being done in a consecutive order along the arcuate path of the revolvable turret. The revolvable turret is used as the delivering device to carry the containers from one processing machine to another until the containers are fully processed and ready to ship.

The revolvable turret holds the containers in circumferential pockets to prevent any deviation of the containers from the arcuate path of travel. Typically, the empty container enters a pocket of the revolvable turret from a conveyor system, it is taken by the revolvable turret to a first processing machine where it is filled with a product, then it is taken to a second processing machine where a cap is put on the container and finally it is taken to a third processing machine that tightens the cap applied on the container.

All through the various processing stations, the container never leaves the pocket of the revolvable turret. The revolvable turret either has to stop at the various processing stations in a synchronized fashion or has to reduce its speed to accommodate the slowest operation. In either case, this arrangement limits the speed of processing the containers to the speed of the slowest machine positioned around the revolvable turret.

Considering the importance of speed in the processing of containers, may it be filling, capping, labelling or any other types of process, there is a strong demand for an optimized processing system capable of a higher output of packaged products.

OBJECTS AND STATEMENT OF THE INVENTION

It is thus an object of the invention to provide a system for transporting and distributing containers to processing machines in a much faster way than has been done previously.

It is another object of the invention to optimize the processing stations by centralizing processing machines performing essentially the same task along the distribution path of a revolvable turret. The revolvable turret is the central point of a large processing system.

As embodied and broadly described herein, the invention provides a container distribution apparatus comprising:
   a frame;
   said frame being adapted to encircle and support a revolvable turret;
   said turret including a plurality of intermediate transport members spaced about its periphery;
   said intermediate transport members in operation being adapted to (1) receive empty containers from at least one feeding member; (2) supply and receive containers to and from at least one accumulator member; and (3) feed processed containers to an exiting member;
   said at least one accumulator member being in open communication with a processing device and including an inlet channel and an outlet channel;
   each of said channels being adapted to align with at least one of said intermediate transport members.

The apparatus, in accordance with the present invention, preferably further comprises a synchronization unit;
   said synchronization unit being adapted to activate a drive mechanism;
   said drive mechanism being adapted, in operation, to turn said turret in a step-like manner such that at least one of said intermediate transport members is aligned with an inlet or an outlet channel of an accumulator member;
   said synchronization unit, in operation, being adapted to move said turret to maximize the processing of containers.

Advantageously, the synchronization unit commands said revolvable turret to position said intermediate transport members in front of accumulator members for delivering and retrieving said containers, and coordinates the rotation of said revolvable turret so that the traffic of containers is optimized. The synchronization unit advantageously operates the opening and closing of a gating system.

The invention also provides a container distribution apparatus wherein said accumulator members are preferably adapted to transport unprocessed containers from said intermediate transport members to a processing machine and processed containers from said processing machine back to intermediate transport members. Advantageously, said accumulator members comprise an inlet channel and an outlet channel. A further refinement of the invention has said outlet channel further comprising a rejection area.

The apparatus, in accordance with the present invention, also preferably comprises gates adapted to, in a first position, permit movement of containers from said intermediate transport member to said accumulator member, and in a second position, prohibit movement of containers from said intermediate transport member to said accumulator member. The gates are preferably disposed on the frame surrounding the revolvable turret but can also be disposed on the accumulator member or the revolvable turret itself.

Advantageously, the invention further provides a container distribution apparatus, wherein said intermediate transport members comprise at least one opening capable of holding at least one container located in said revolvable turret. Preferably, these openings are slotted openings and they are disposed either in pairs substantially parallel to each other, a first opening of each pair being a delivery opening and a second opening being a retrieving opening; or spaced equally around the revolvable turret.

As embodied and broadly described herein, the invention also provides a container processing apparatus comprising:
   a frame encircling and supporting a revolvable turret, said revolvable turret including intermediate transport members in the shape of slots arranged in substantially parallel pairs and adapted to receive containers from a feeding member, to transport and to deliver said containers to accumulator members, to retrieve said containers from said accumulator members, and to transport said containers to an exiting member, each said accumulator members being capable of carrying containers to and from a processing machine;
   a synchronization unit, said unit being to coordinate the transfer of containers to and from said accumulator members by controlling the rotation of the revolvable turret and by controlling the opening and closing of gates located at the junction of said intermediate transport members and said accumulator members;

at least one processing machine, said machine being supplied with unprocessed containers by an inlet side of said accumulator members and being released of processed containers by an outlet side of said accumulator members.

The basic idea of the present invention is to remove the processing machines from the central revolvable turret. In the prior art, a container would go through all the processing steps as it went around the turret or some other distribution mechanisms. This method slows down the processing to the speed of the slowest processing machine since the container has to go through all the steps one after the other.

The present invention speeds up the process by putting accumulator members between the revolvable turret and the processing machines. In order for this method to work, the distribution apparatus has to be viewed as a unique processing station. All the processing machines connected to the distribution apparatus perform the same function and only one function. This arrangement increases dramatically the output of the processing station. The processing station is no longer dependant on the speed of the actual processing machines. From the different processing machines located around the distribution apparatus comes a steady flow of processed containers and this makes the processing station utilizing the distribution apparatus much faster than what is commonly used in the prior art.

Another advantage of the present invention is that by centralizing the processing machines performing the same function in one area as the present invention does, it optimizes the supply of products to the processing machines. Instead of having similar processing machines on different production lines being supplied individually, the arrangement of the present invention allows the supply of product to the processing machines to be done in one location.

Other objects and features of the invention will become apparent by reference to the following description and the drawings.

BRIEF DESCRIPTION OF THE DRAWINGS

A detailed description of the preferred embodiments of the present invention is provided hereinbelow, by way of example only, with reference to the accompanying drawings, in which.

Figure 1:
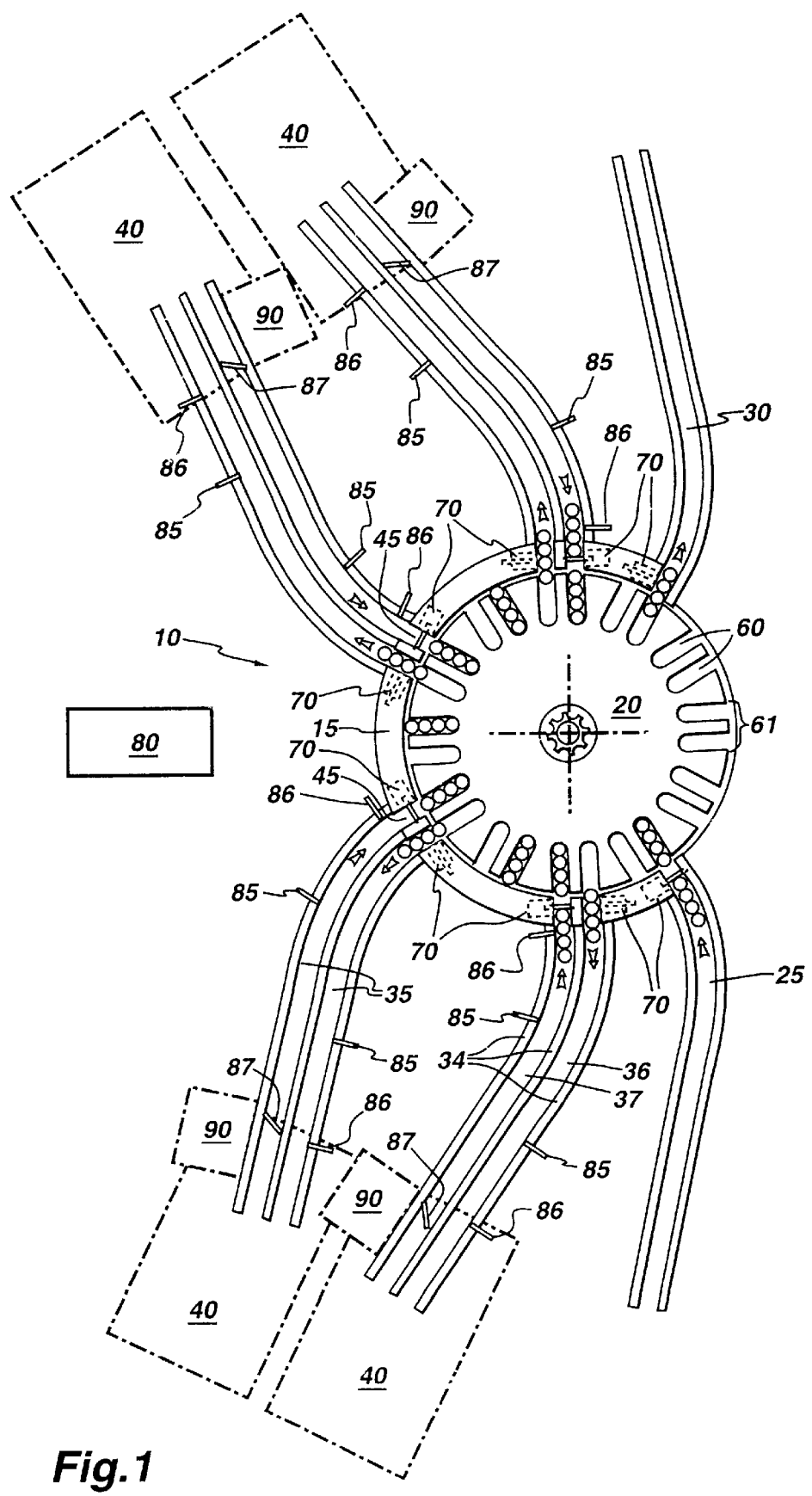
FIG. 1 is a top plan view illustrating a container distribution apparatus

In the drawings, preferred embodiments of the invention are illustrated by way of examples. It is to be expressly understood that the description and drawings are only for the purpose of illustration and are an aid for understanding. They are not intended to define of the limits of the invention.

DETAILED DESCRIPTION OF PREFERRED EMBODIMENTS

The annexed drawings illustrate an example of a container distribution apparatus identified comprehensively by the reference numeral 10. Referring to FIG. 1, encased in frame 15 is the revolvable turret 20. Connected to the frame 15 are the feeding member 25, the exiting member 30 and accumulator members 35. Each accumulator member 35 is connected to a processing machine 40 and for each processing machine 40, there is an inlet accumulator member 36 and an outlet accumulator member 37. A series of apertures 45 in the frame 15 allows passage of the containers to and from the accumulator members 35. In the illustrated example, the accumulator members 35 are made of a conveyor belt (shown graphically) and guide rails 34 to prevent containers from falling. The conveyor belts are running continuously under the containers held in different area of the distribution apparatus 10 and therefore have a low coefficient of friction to slide under the containers without disturbing them.

The revolvable turret 20 comprises intermediate transport members 60 preferably in the form of slotted openings capable of taking at least one container and transport it to the different locations around the revolvable turret 20. In this illustrated embodiment, the slotted openings can accommodate four containers. These intermediate transport members 60 are preferably disposed in pairs 61 substantially parallel to each other so that the rotation of the revolvable turret 20 can be indexed to position the appropriate intermediate transport members 60 in front of the appropriate gates 70 located around the frame 15 and in line with each accumulator members 35. The parallelism of the pairs of intermediate transport members 60 serves to facilitate the disposition of the accumulator members 35 but is not a necessary feature. According to variants of the invention, the intermediate transport members 60 could also take the form of a set of jaws or clamps that would grab the containers and release them at the appropriate time.

Figure 2:
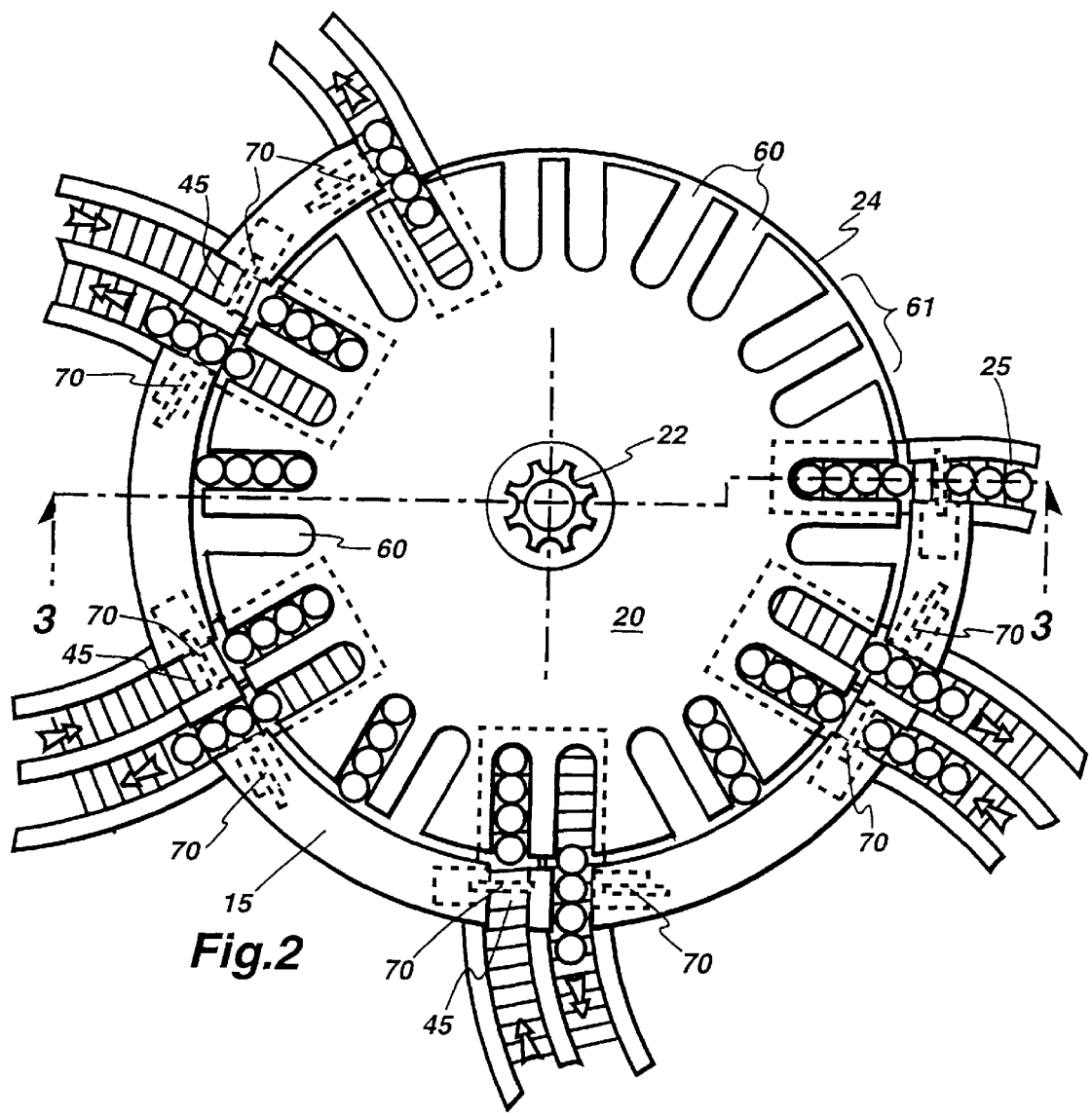
FIG. 2 is a enlarged top plan view of the central part of the invention.
Figure 3:
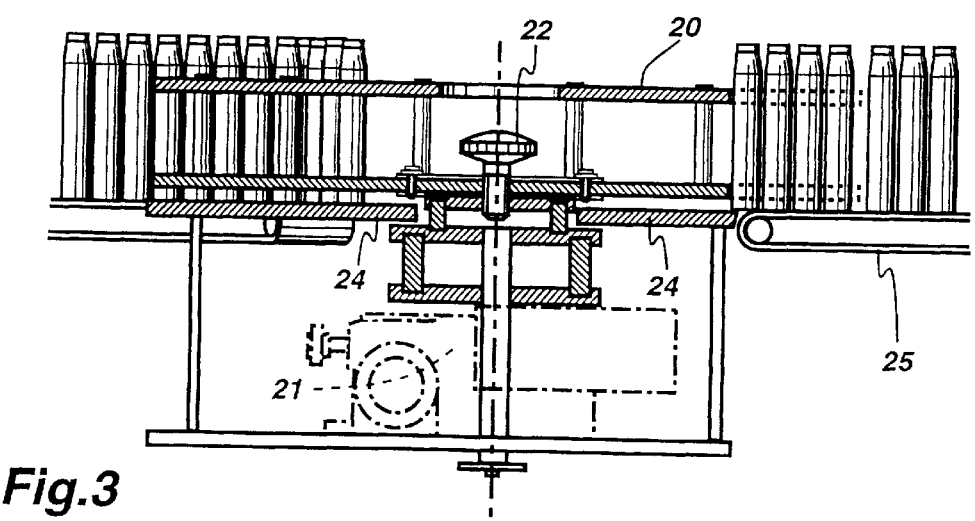
FIG. 3 is an cutaway view of a FIG. 2 taken at line 3—3.
Figure 4:
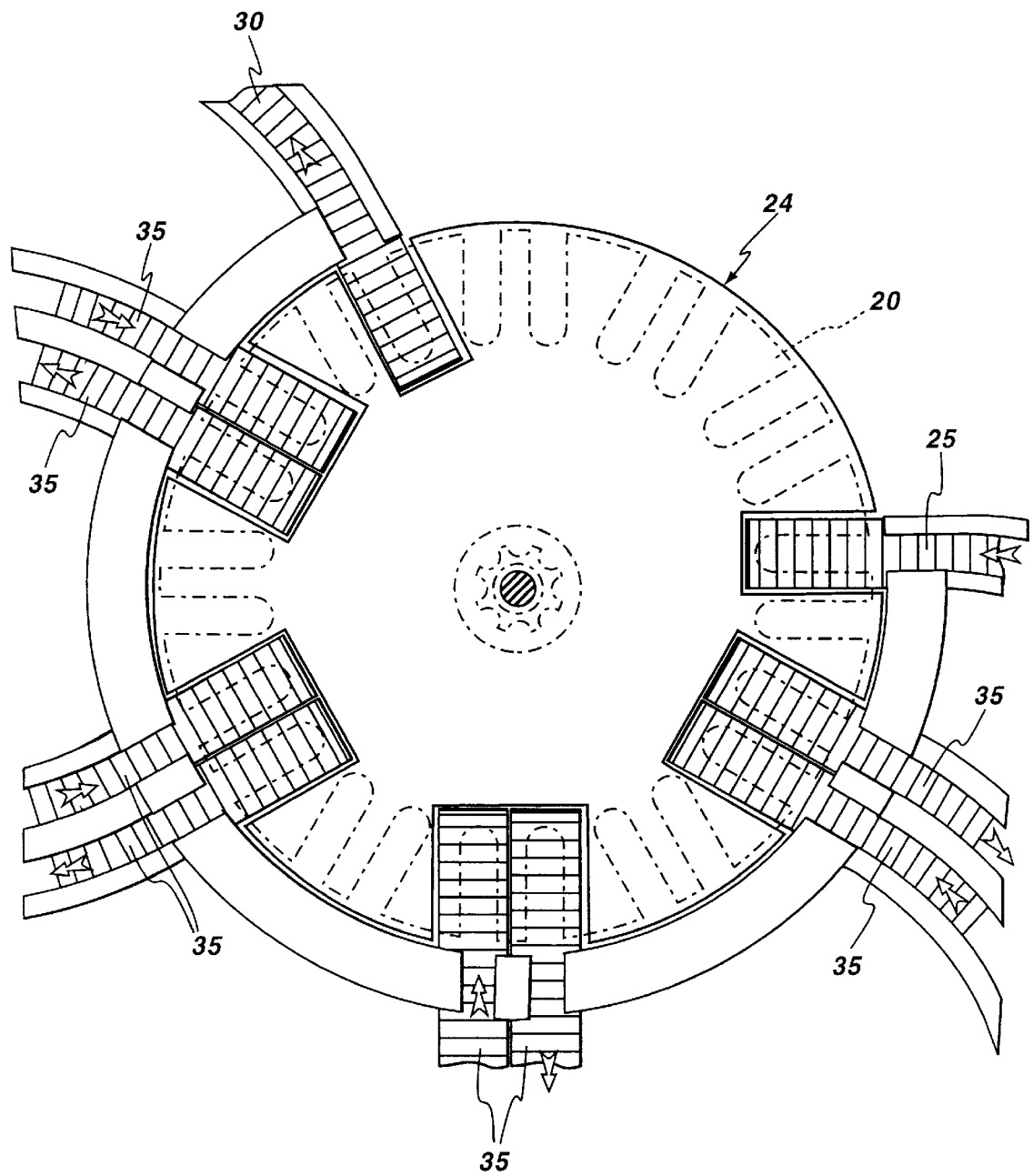
FIG. 4 is a further enlarged top plan view of the central part of the invention with the revolvable turret shown in dotted lines to visualize the disposition of the conveyor belts underneath the revolvable turret.

Each accumulator member 35 extends beyond the frame 15 underneath the revolvable turret 20 as shown in FIG. 2 by the dotted lines and FIG. 4 in which the revolvable turret 20 has been removed to show the lay-out of conveyor belts and the table top 24. The table top 24 is made of a low friction material so that containers can slide easily when the revolvable turret 20 is rotating. Containers are supported by either the table top 24 or the conveyor belt of the accumulator members 35. Similarly, the feeding member 25 and the exiting member 30 also extend underneath the revolvable turret 20 as shown in FIG. 2 by the dotted lines and by FIGS. 3 and 4.

A gating system 70 monitors the transfer of containers from the intermediate transport members 60 of the revolvable turret 20 to the inlet accumulator members 36 and from the outlet accumulator members 37 to the intermediate transport members 60 of the revolvable turret 20. A synchronization unit 80 operates and manages the opening and closing of the different gates 70. When one of the gates 70 on the side of the inlet accumulator members 36 is opened, the containers located in the intermediate transport members 60 are forced to move out of the intermediate transport members 60 by the action of the conveyor belt of the inlet accumulator members 36. Note that conveyor belts extend underneath the revolvable turret 20 and are in contact with the containers when the containers are held in the intermediate transport members 60. Also note that all gates 70 around the distribution apparatus are in the closed position when the revolvable turret 20 is rotating. The operation of opening and closing of the gates are done when the intermediate transport members 60 are aligned with the accumulator members 35 and are immobilized.

Figure 5:
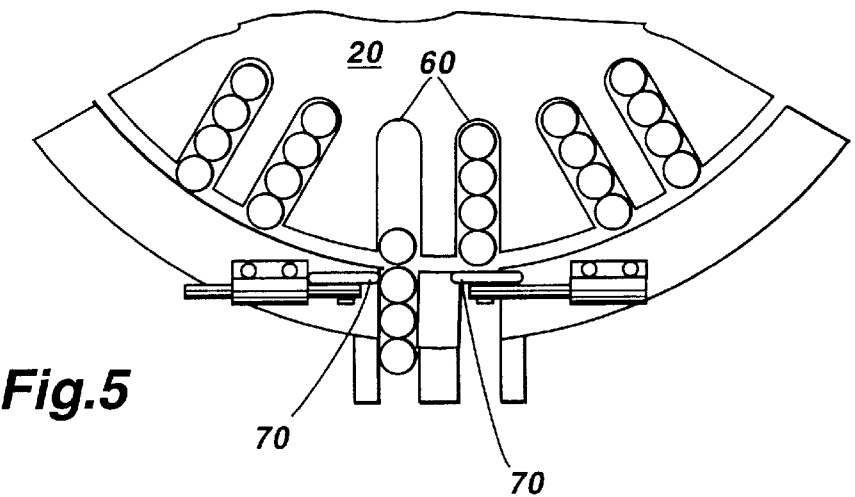
FIG. 5 is an enlarged top plan view of one embodiment of the gating system.
Figure 6:
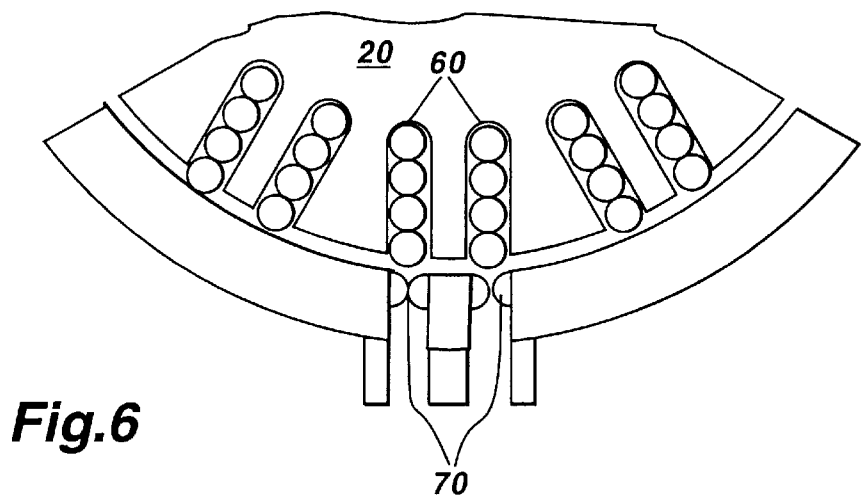
FIG. 6 is an enlarged top plan view of a second embodiment of the gating system.
Figure 7:
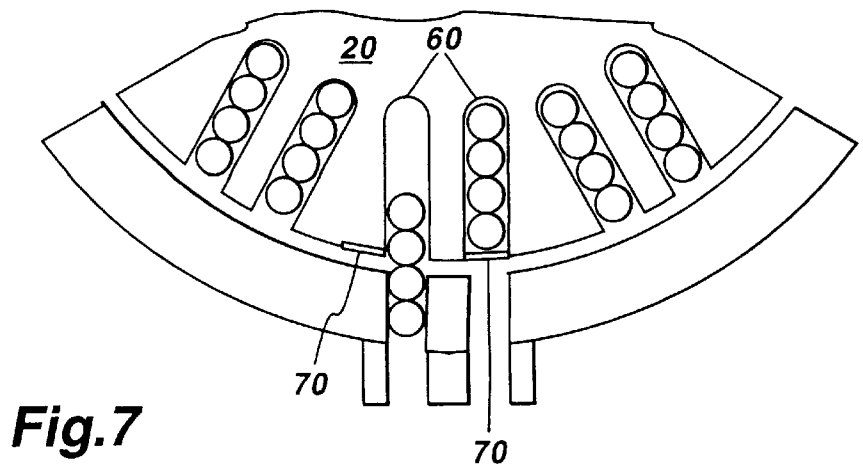
FIG. 7 is an enlarged top plan view of a third embodiment of the gating system.
Figure 8:
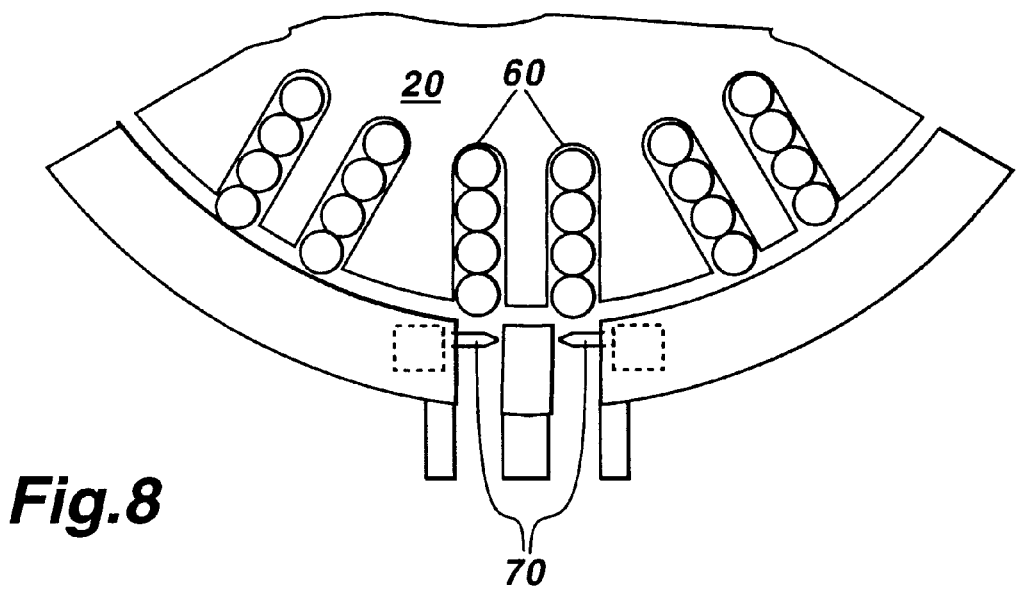
FIG. 8 is an enlarged top plan view of a fourth embodiment of the gating system.
Figure 9:
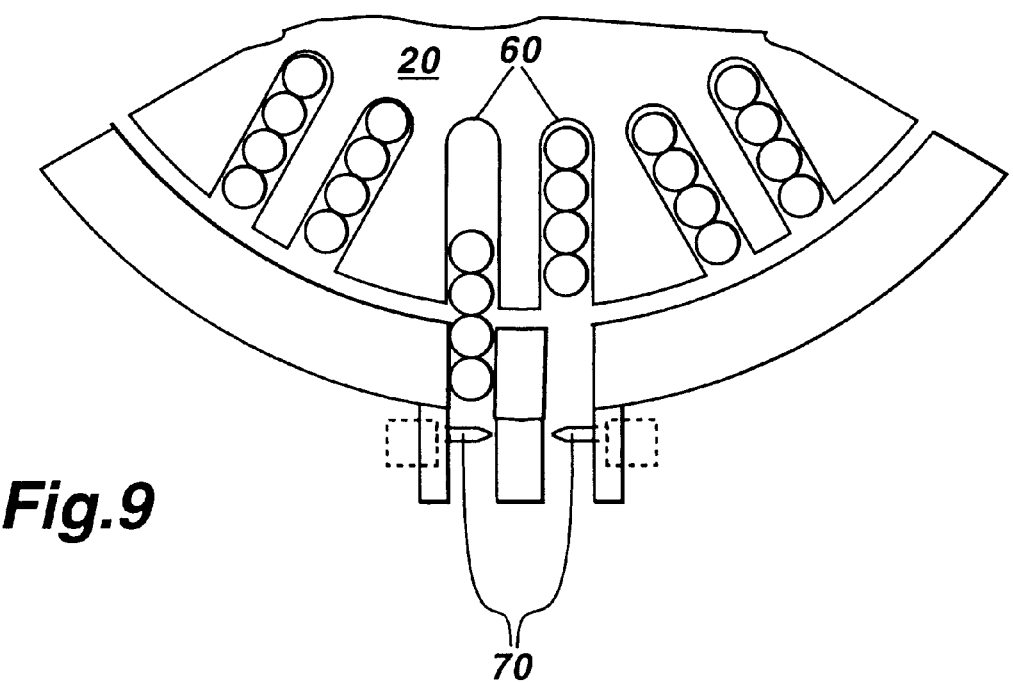
FIG. 9 is an enlarged top plan view of a fifth embodiment of the gating system.

In a most preferred embodiment of the invention, FIG. 8 shows the gating system 70 located directly in frame 15 and comprises pneumatically controlled pointed rods that when extended close the path of the containers and, when retracted open the path of the containers. The pointed shape allow the rods to separate two containers when these have accumulated in the outlet accumulator members 37. In other variants of the invention, the gating system 70 can be located directly on the revolvable turret 20 as illustrated in FIG. 7 where small sliding mechanisms are used as gates 70 to open and close the path of containers in and out of the intermediate transport members 60. FIG. 9 shows the gating system 70 located on the sides of the accumulator members 35. The gates 70 are pneumatically controlled pointed rods that when extended close the path of the containers and, when retracted open the path of the containers. In FIG. 5, it can be seen that the gates 70 are positioned on frame 15 and are made of pneumatically controlled piston rods with a door-like shape. When extended the gates 70 close the path of the containers and when retracted, the gates 70 open the path of the containers. In another variants, referring to FIG. 6, the gates are of bladder type; blocking the path of the containers when inflated and opening the path of the containers when deflated. Whichever type of gating system is used, the function and synchronization of the gating system remains the same.

In another embodiment, the conveyor belts of the accumulator members 35 extend underneath the revolvable turret 20 but are not in contact with the containers held in the intermediate transport members 60. The containers are removed from or deposited into the intermediate transport members 60 by raising the conveyor belt of the accumulator members 35 so that it comes in contact with the containers and forces the latter to move in the direction of the conveyor. The raising and lowering of the conveyor system is controlled by the synchronization unit 80 which actuates pneumatic cylinder located at the end of each accumulator members 35.

In yet another embodiment, the conveyor belts of the accumulator members 35 extend underneath the revolvable turret 20 and are in contact with the containers held in the intermediate members 60 but the conveyor belts do not run continuously. The containers are removed from or deposited into the intermediate transport members 60 by starting and stopping the conveyor belts of the accumulator members 35 as need be. Again, the synchronization unit 80 controls the operation of the conveyor belts.

At this point, it is important to note that the container distribution apparatus can handle a large variety of containers. If for instance, larger containers need to be handle by the apparatus, the revolvable turret 20 can be changed rapidly for another revolvable turret 20 which can accommodate the larger containers. Similarly small containers can be handle by the apparatus by changing the revolvable turret 20. The revolvable turret 20 is connected, at its center, to a drive mechanism 21 with one large handle bolt 22. Unfastening the handle bolt 22 will free the revolvable turret 20 which can then be removed and replaced with a new one. Each diameter of container requires a different revolvable turret 20. These can be stored near the container distribution apparatus for easy access.

The drive mechanism 21 may be a motor, a cam drive, a Geneva drive or any type of drive mechanism adapted in operation to turn the revolvable turret 20 in a step-like manner such that at least one pair of intermediate transport members is aligned with an inlet and outlet channel of an accumulator member The path of processing is as follow:

A load of at least one (preferably four) unprocessed containers is supplied to the intermediate transport members 60 of the revolvable turret 20 by the feeding member 25 which in this case, takes the form of a conveyor belt. As shown in FIG. 1, only one of the pair 61 of intermediate transport members 60 is actually supplied with containers, the other intermediate transport member 60 of the pair 61 is left empty so as to be able to pick up processed containers down the line from one of the outlet accumulator members 37.

Once the load of unprocessed containers is picked up by an intermediate transport members 60, the revolvable turret 20 rotates towards the accumulator members 35 and stops the pair 61 of intermediate transport members 60 directly in front of two accumulator members 36 and 37 of one of the processing machines 40 disposed around the container distribution apparatus 10. The intermediate transport member 60 carrying the unprocessed containers is aligned with the inlet accumulator members 36 and the still empty intermediate transport member 60 aligns itself with the outlet accumulator members 37. A synchronization unit 80 controls the rotation, starting and stopping of the revolvable turret 20.

High level sensors 85 and low level sensors 86, preferably optical, are installed in the path of travel of inlet accumulator members 36 and outlet accumulator members 37. For the inlet accumulator members 36, the sensors 85 and 86 are positioned near the processing machines 40. The low level sensor 86 is positioned closest to the processing machine along the path of travel of the containers. When there are no containers in front of the low level sensor 86, it indicates to the synchronization unit 80 that this inlet accumulator member 36 needs a load of containers. The high level sensor 85 is positioned upstream from the low level sensor 86; when a sufficient amount of containers has accumulated and is waiting to be processed, the last containers of the row of accumulated containers trigger the high level sensor 85 which lets the synchronization unit 80 know that there are enough containers in this line. With either one of these information, the synchronization unit 80 sends a signal to the gate 70 located at the entrance of the inlet accumulator member 36 to open and let more containers through or to stay close and not let any more containers through. The conveyor belt of the accumulator members 36 is always in motion but since it is made of a low friction material, it simply slides under the containers waiting to be processed.

Once a container has been processed by the processing machine 40, it is delivered to the outlet accumulator member 37 which in turn returns it to the intermediate transport members 60 of the revolvable turret 20. Advantageously, if the processing machine 40 detects an error in the processing of a container, it will be signaled to the synchronization unit 80 which in turn will actuate a safety gate 87, located along the path of travel of the outlet accumulator member 37 but close to the processing machine 40, that will redirect the faulty container to a rejection area 90. If the processing is completed without any fault signals, the processed container is carried by the outlet accumulator member 37 to the gate 70 located at the exit of the outlet accumulator member 37. Another set of high level sensor 85 and low level sensor 86 are positioned on the outlet accumulator member 37 near the exit end. The gate 70 remains closed to prevent passages of processed containers. When a sufficient amount of containers has accumulated, the last containers will accumulate up to the position where the high level sensor 85 is and will trigger a signal to let the synchronization unit 80 know that there are enough containers accumulated in this line to open the gate 70 and let the processed containers return to the intermediate transport members 60. The low level sensor 86 is positioned at a distance from gate 70 that is substantially the same as the length of the intermediate transport members 60 so that as long as the low level sensor 86 is not triggered by (in this embodiment) the fourth processed container (the length of the intermediate transport members 60) the gate 70 will remain closed to avoid retrieving less than a full load of processed containers which would be less than four in this embodiment. Again, the conveyor belt of the outlet accumulator members 37 is always in motion but since it is made of a low friction material, it simply slides under the containers waiting to be returned to the intermediate transport member 60.

The synchronization unit 80 also keeps in memory the condition of each intermediate transport members 60, that is to say, the synchronization unit 80 knows whether an intermediate transport members 60 is full or empty. The synchronization unit 80 controls the rotation of the revolvable turret 20 and at all time, knows the exact position of each pairs 61 of intermediate transport members 60 around the revolvable turret 20 in relation to the accumulator members 35. Since the synchronization unit 80 also operates the gating system 70, it stores in its memory whether the intermediate transport member 60 has been filled or emptied. Once a pair 61 of intermediate transport members 60 has delivered its load of unprocessed containers and retrieved a load of processed containers, this pair 61 will not be used again until it has emptied its load of processed containers into the exiting member 30.

The function of the synchronization unit 80 is to manage the priorities generated by the high level and low level sensors 85 and 86 of the accumulator members 35. The synchronization unit 80 controls the rotation of the rotating turret 20 and the opening and closing of the gating system 70. With the control of these two elements, the synchronization unit 80 is able to deliver unprocessed containers to the inlet accumulator member 36 that will run out shortly, and retrieve processed containers to an outlet accumulator member 37 that has accumulated at least four containers.

As can be seen in FIG. 1, the loading and unloading of containers by the pairs 61 of intermediate transport members 60 is accomplished simultaneously in different locations around the revolvable turret 20. The intermediate transport members 60 of the revolvable turret 20 are aligned with accumulator members 35 and will stay immobilized just long enough for the containers to be loaded and unloaded.

Figure 10:
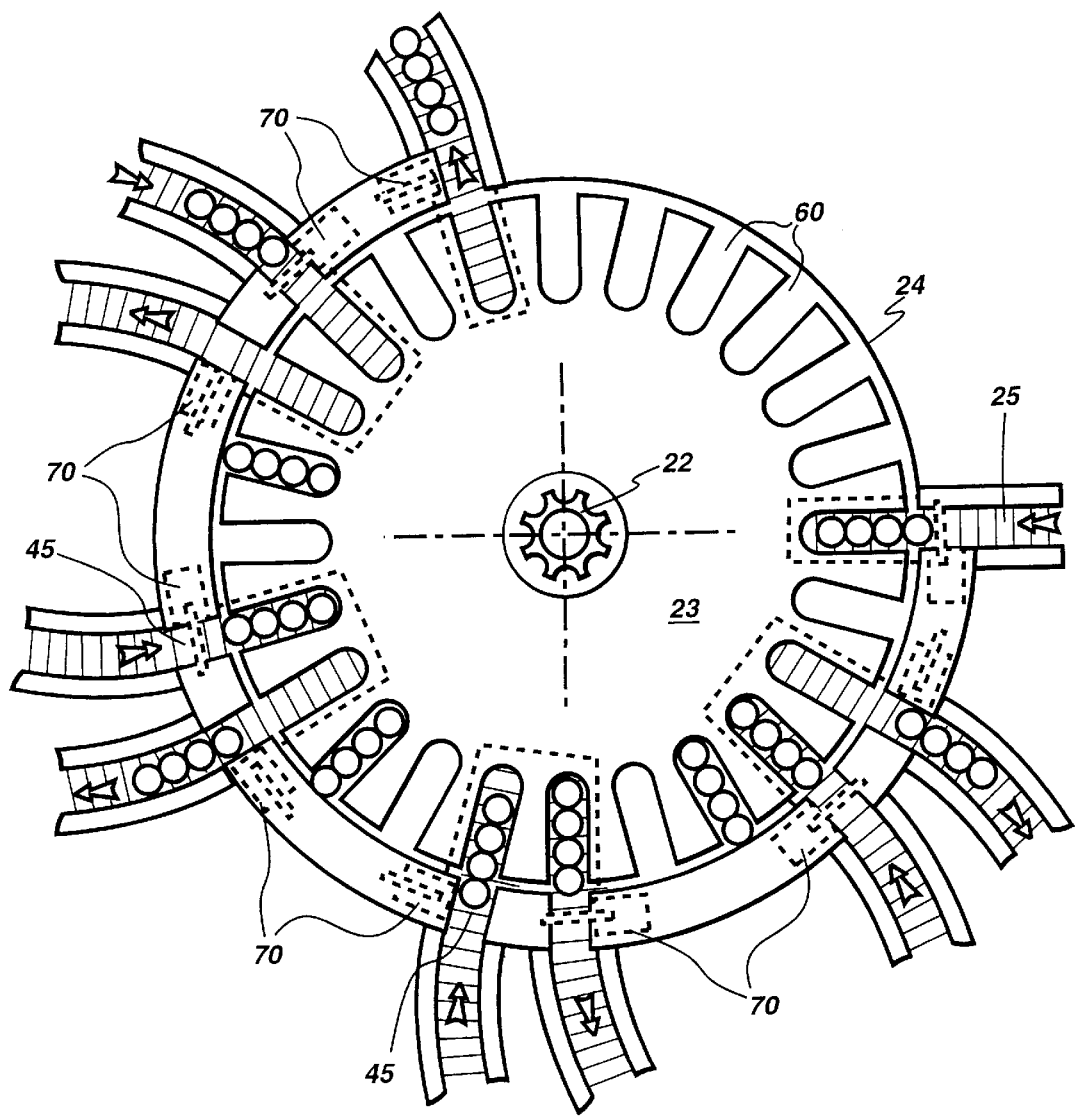
FIG. 10 is a top plan view of a second embodiment of the invention.

FIG. 10 illustrates a second embodiment of the container distribution apparatus. Instead of comprising pairs of intermediate transport members 60, the revolvable turret 23 includes an array of single intermediate transport members 60 adapted to perform both functions of delivering unprocessed containers to the inlet accumulator members 36 and retrieving processed containers from the outlet accumulator members 37. In this embodiment, once an intermediate transport member 60 delivers a load of empty containers to an inlet accumulator member 36, it becomes available for retrieving processed containers from any outlet accumulator members 37. The flexibility of this arrangement effectively adds to the collective number of empty intermediate transport members 60 available for retrieving, all the intermediate transport members 60 that were dedicated for delivery in the first embodiment. The non-productive empty intermediate transport members 60 that previously passed by the exiting member 30 are thus eliminated and throughput may be increased by this addition of available intermediate transport members 60 for retrieval. Throughput may also be increased by reducing the time interval between two stops of the revolvable turret 23. Indeed, the revolvable turret 23 step-like rotational movement is indexed to position each intermediate transport members 60 in front of each inlet and outlet accumulator members 36 and 37 and these rotational steps are shorter and less time consuming than the longer rotational steps necessary for the pairs of intermediate transport members 60 of the first embodiment. With the second embodiment, the revolvable turret 23 becomes simpler and cheaper to manufacture because all the intermediate transport members 60 are arranged radially and are equally spaced.

In the second embodiment, the synchronization unit 80 must keep track of the state of each intermediate transport member 60 in order to utilize them efficiently. Three possible states may be attributed to an intermediate transport members 60: 1-empty, 2-full of unprocessed containers and 3-full of processed containers. By controlling the gates of the feeding member 25, of each inlet and outlet accumulator members 36 and 37 and of the exiting member 30, the synchronization unit 80 is able to attribute a particular state to the intermediate transport member 60 located in front of the gate being activated corresponding to the result of gate activation. The "empty" state will be assigned to intermediate transport members 60 located in front of inlet accumulator members 36 and exiting member 30 when their respective gates are activated (opened). The "full of unprocessed containers" state is assigned to intermediate transport members 60 located in front the feeding member 25 when the gate is activated. The "full of processed containers" state will be attributed to intermediate transport members 60 located in front of outlet accumulator members 37 when its corresponding gate is activated.

It is important to note that in this second embodiment, the synchronization unit 80 must balance the entering unprocessed containers with the exiting processed containers to insure that the system does not become overloaded with unprocessed containers and incapable of removing processed containers as the number of "empty" intermediate transport members 60 required for removal purposes would be reduced. Therefore, the synchronization unit 80, after being initialized, will allow the refilling of an "empty" intermediate transport member 60 with unprocessed containers by the feeding member 25 only when a "full of processed containers" intermediate transport member 60 has dumped its load into the exiting member 30. An empty intermediate transport member 60 that has not released a load of containers into the exiting member 30 will not be refilled by the feeding member 25 because its "empty" status is accounted for eventual removal purposes. Also, each time the number of containers rejected into the rejection area 90 and therefore, not returned to the revolvable turret 23, amounts to four, a new group of four containers is permitted to enter into an "empty" intermediate transport member 60 that was left "empty" for removal purposes.

In summary, the total need for empty intermediate transport members 60 for removal will, in the course of running, balance the number of intermediate transport members 60 carrying unprocessed containers. The main purpose for the accumulator members 35 serving each processing machines remains, as in the first embodiment, a buffer for the short term random imbalance.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. A container distribution apparatus comprising:
   a frame;
   revolvable turret including a plurality of intermediate transport members spaced about its periphery, said frame encircling and supporting said revolvable turret;
   at least one accumulator member in open communication with a processing device, said accumulator member including an inlet channel and an outlet channel;
   said intermediate transport members being operative to:
   (a) receive empty containers from at least one feeding member,
   (b) supply and receive containers to and from said at least one accumulator member, and
   (c) feed processed containers to an exiting member;
   said at least one accumulator member being capable to simultaneously convey containers to and from the processing device, each of said inlet and outlet channels being adapted to align with at least one of said intermediate transport members.

2. A container distribution apparatus as defined in claim 1, further comprising a synchronization unit and a drive mechanism, said synchronization unit operative to activate said drive mechanism for turning said turret in a step-like manner such that at least one of said intermediate transport members is aligned with said inlet or said outlet channel of said accumulator member, said synchronization unit, in operation, capable to move said turret to maximize the processing of containers.

3. A container distribution apparatus as defined in claim 2, wherein said synchronization unit is further operative to activate gates, said gates being adapted to permit or prohibit movement of containers between said at least one accumulator and said intermediate transport members.

4. A container distribution apparatus as defined in claim 2, wherein said synchronization unit is further adapted to control movement of containers within said inlet and outlet channels by activating or deactivating endless belts located in said channels.

5. A container distribution apparatus as defined in claim 1, wherein said revolvable turret is adapted to, in one position, permit delivery of containers to an accumulator member, and in another position, to prohibit delivery of containers to an accumulator member.

6. A container distribution apparatus as defined in claim 5, wherein said revolvable turret includes at least one gate adapted to, in a first position, permit delivery of containers to an accumulator member, and in a second position, prohibit delivery of containers to an accumulator member.

7. A container distribution apparatus as defined in claim 1, wherein said frame includes at least one gate adapted to, in a first position, permit delivery of containers to an accumulator member, and in a second position, prohibit delivery of containers to an accumulator member.

8. A container distribution apparatus as defined in claim 1 including a plurality of accumulator members, wherein said accumulator members are adapted to, in a one position, permit entrance of containers from an intermediate transport member, and in another position, prohibit entrance of containers from said intermediate transport member.

9. A container distribution apparatus as defined in claim 8, wherein said accumulator members include at least one gate adapted to, in a first position, permit entrance of containers from an intermediate transport member, and in a second position, prohibit entrance of containers from an intermediate transport member.

10. A container distribution apparatus as defined in claim 1, wherein said intermediate transport members comprise at least one opening capable of holding at least one container located in said revolvable turret.

11. A container distribution apparatus as defined in claim 10, wherein said at least one opening is a slotted opening.

12. A container distribution apparatus as defined in claim 10, wherein said intermediate transport members are disposed in pairs substantially parallel to each other, a first opening of each pair of intermediate transport members being a delivery opening and a second opening of each pair of intermediate transport members being a retrieving opening.

13. A container distribution apparatus as defined in claim 1, wherein said at least one accumulator member comprising an inlet and an outlet channel further comprises a rejection area in communication with said outlet channel.

14. A container distribution apparatus as defined in claim 1, wherein said at least one accumulator member includes a pair of endless, parallel belts, each belt moving in a direction that is opposite the direction of the other belt.

15. A container distribution apparatus as defined in claim 14, wherein said conveyor belts of an accumulator member extend underneath said intermediate transport members and are in contact with containers held in said intermediate transport members.

16. A container distribution apparatus as defined in claim 1, wherein said at least one accumulator member is adapted to transport (1) unprocessed containers from said intermediate transport members to a processing machine; and (2) processed containers from said processing machine back to said intermediate transport members.

17. A container distribution apparatus as defined in claim 1, wherein said at least one feeding member is adapted to supply said intermediate transport members with containers.

18. A container distribution apparatus as defined in claim 1, wherein said exiting member is adapted to remove containers from said intermediate transport members.

19. A container distribution apparatus as defined in claim 1, wherein said at least one feeding member and said exiting member include conveyor belts.

20. A container distribution apparatus as defined in claim 19, wherein said conveyor belts of said at least one feeding member and said exiting member extend underneath said intermediate transport members are in contact with containers held in said intermediate transport members.

21. A container distribution apparatus as defined in claim 1, further comprising a table top located below said revolvable turret, said table top being adapted to support containers in said intermediate transport members.

22. A container distribution apparatus as defined in claim 21, wherein said table top is constructed of a low friction material, thus permitting containers to slide smoothly on its surface when said apparatus is in operation.

23. A container distribution apparatus comprising:

a frame;

a revolvable turret including intermediate transport members in the shape of slots arranged in substantially parallel pairs, said frame encircling and supporting said revolvable turret, said intermediate transport members being operative to:
  (a) receive containers from a feeding member,
  (b) supply and receive said containers to and from accumulator members, each of said accumulator members comprising an inlet channel and an outlet channel, and
  (c) feed said containers to an exiting member;

a synchronization unit operative to coordinate the transfer of containers to and from said accumulator members by controlling the opening and closing of gates located at the junction of said intermediate transport members and said accumulator members; and at least one processing machine, said processing machine receiving unprocessed containers from the inlet channel of one of said accumulator members and releasing processed containers to the outlet channel of one of said accumulator members, each of said accumulator members being capable to simultaneously carry containers to and from the processing machine.

* * * * *